Dec. 31, 1968  A. H. BELLOWS  3,418,907
PHOTOGRAPHIC CAMERA ERECTING SYSTEM
Filed March 18, 1966  Sheet 1 of 3

INVENTOR
Alfred H. Bellows
BY Brown and Mikulka
and
Charles S. McGuire
ATTORNEYS Dec. 31, 1968  A. H. BELLOWS  3,418,907

PHOTOGRAPHIC CAMERA ERECTING SYSTEM

Filed March 18, 1966  Sheet 2 of 3

INVENTOR
Alfred H. Bellows

BY Brown and Mikulka
and
Charles S. McGuire
ATTORNEYS

United States Patent Office 3,418,907
Patented Dec. 31, 1968

3,418,907
PHOTOGRAPHIC CAMERA ERECTING SYSTEM
Alfred H. Bellows, Cambridge, Mass., assignor to Polaroid Corporation, Cambridge, Mass., a corporation of Delaware
Filed Mar. 18, 1966, Ser. No. 535,467
4 Claims. (Cl. 95—39)

The present invention relates to photographic camera structures, and more specifically to structures for maintaining a lens board in a stable, operative position with respect to the camera film plane and providing relative movement between the lens board and camera body between the aforesaid operative position and a folded position closely adjacent one another.

For camera lens systems having a focal length which is comparatively long relative to the lens aperture, in the interest of providing a compact device, it has been found convenient to provide apparatus for allowing movement of the lens system between a position closely adjacent the film plane within the camera body and a position wherein the film plane and the focal plane of the lens system are substantially coextensive. To provide a covered or protected optical path between the lens system and the film, such cameras usually include means such as an expansible and collapsible bellows. The prior art includes a large number of mechanical systems for supporting the camera objective lens, or the lens board upon which it is mounted, and for maintaining it in proper registration with the camera film plane when in the extended position. Such apparatus is commonly referred to as the camera or lens "erecting system" and often includes a camera bed upon which the lens board is supported. A mechanical linkage system comprising one or more rigid braces or links extending between the lens board and either the camera bed or the camera body is normally provided to hold the lens in proper relationship to the film plane.

The present invention relates to a camera erecting system having two stable positions, one with the lens in the extended, operative position, and the other with the lens folded to a position in proximity with the camera body, which requires no latching means, or the like, to maintain it in either position. The erecting system may conveniently be entirely enclosed within the camera bellows, thereby adding no external, protruding parts on the camera. Furthermore, the erecting system may conveniently be constructed entirely from inexpensive materials such as plastic, thereby achieving significant economies of construction. An additional advantage is the simplicity of the structure and its ease of combination with the appropriate camera parts.

It is a principal object of the invention to provide an erecting system for a folding camera which is effective to maintain the lens board positively in either the folded or extended position without the use of latching means which must be unlocked or otherwise moved to permit relative movement of the lens board and camera body from one position to the other.

It is a further object to provide a camera erecting system which is entirely enclosed by the camera bellows and is effective to maintain the lens board in either of two positive positions with respect to the camera body, and allows movement between such positions without the necessity of engaging any portions of the camera other than the lens board and camera body.

It is another object to provide a simple and inexpensive camera erecting system which provides a rigid, positive means for maintaining the lens board in either folded or extended position relative to the camera body.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
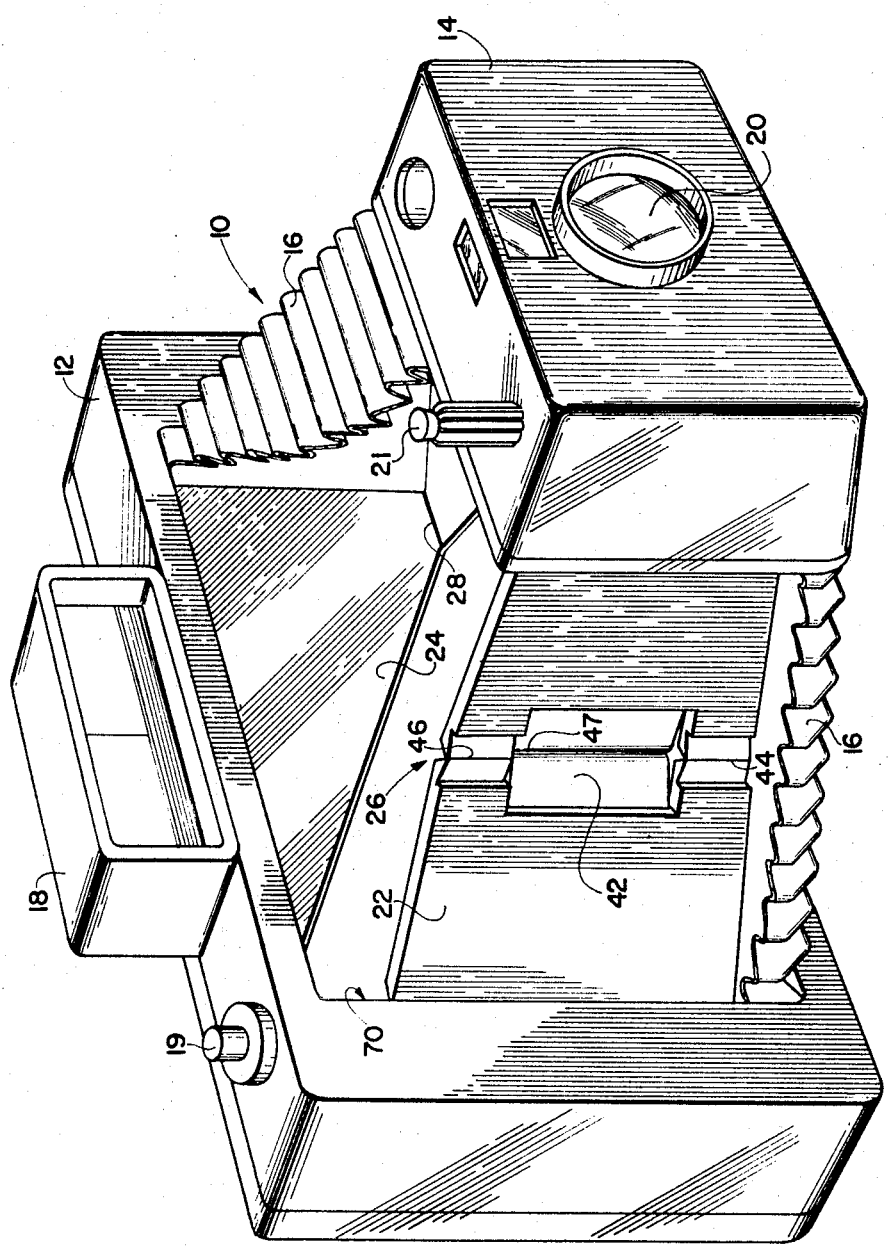
FIG. 1 is a perspective view of a photographic camera incorporating the elements of the present invention, with portions broken away.

Referring now to the drawings, there is shown in FIG. 1 a folding camera structure designated generally by the reference numeral 10 having the usual camera body 12, lens and shutter housing 14 and bellows 16 forming a protected light path between the two. Camera body 12 serves in known fashion as a means for mounting a photosensitive film and for positioning the latter in a predetermined film plane for exposure. Also, camera body 12 may serve as a means for mounting a viewfinder and/or rangefinder 18, release button 19, operatively connected to the camera shutter, and other conventional items normally associated with such cameras. Housing 14 serves as a means for mounting objective lens 20, by means of which the scene to be photographed is focused at the film plane within camera body 12, button 21 for adjustment of aperture size, shutter speed, or the like, and other conventional elements. Lens 20 may be a single or multi-element lens system, and may be of the fixed focus type, or be movable relative to the film plane for variable focusing at different camera-to-subject distances.

As explained later herein, the erecting system of the invention in the illustrated embodiments is designed to provide fixed, operative position for lens 20 with respect to the film plane within camera body 12 during exposure. Therefore, if lens 20 is to be of the variable focus type, means should be provided for moving the lens, or one element thereof, relative to housing 14. That is, the lens system should be of the so-called "front element" focusing type rather than the "unit" focusing type wherein the entire lens system is moved relative to the film plane. Although the illustrated embodiments of the invention are either of the fixed focus or front element focusing type, the erecting system of the invention may be adapted and used with a unit focusing system, as will be explained in the pertinent part of the ensuing description.

Bellows 16 forms a protected light path between objective lens 20 and the film plane within camera body 12 and may take the usual configuration of a truncated pyramid. The bellows may be folded along lines transverse to the major axis thereof for movement between extended and retracted positions with respect to the camera body. Hence, bellows 16 is entirely conventional and is not to be confused with the erecting system described in the following paragraphs, although such system may conveniently be entirely enclosed within the bellows and lie in a position closely proximate thereto when in the erected or operative position of the camera.

Bellows 16 is partially cut away in FIG. 1 to illlustrate more clearly the relationship thereto of the structural elements of the erecting system of the invention. The elements are shown in FIG. 1 in the fully erected position, i.e., with objective lens 20 operatively positioned to focus a scene to be photographed at the camer film plane. Side members 22 and 24 are shown in FIG. 1, both of which are secured at one end to camera body 12 and at the other end to housing 14. Side member 22 includes biasing hinge portion 26, to be described more fully hereinafter, and side member 24 includes hinge or fold line 28. The folding axes of hinges 26 and 28 are perpendicular to one another and to the optical axis of the camera.

Figure 2:
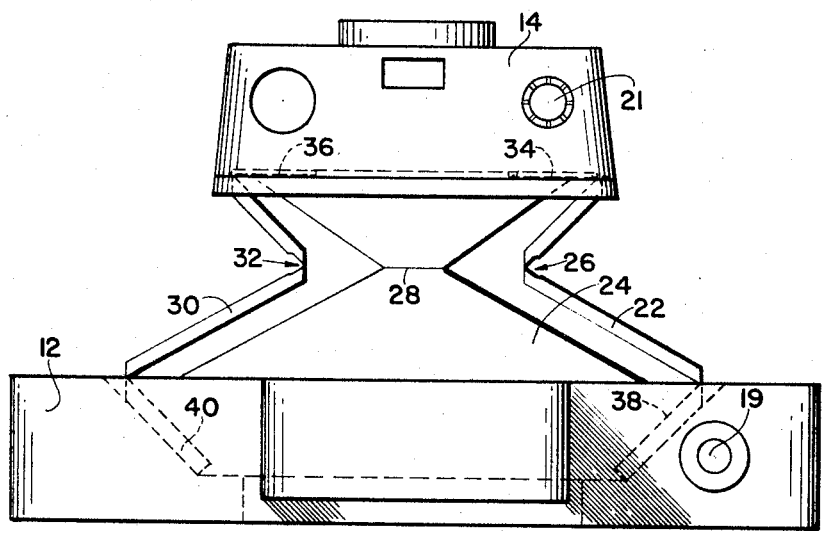
FIG. 2 is a plan view of the camera of FIG. 1 showing the elements of the invention in an intermediate position of their movement.

In FIG. 2 the elements of camera 10 are shown with housing 14, and thus objective lens system 20, in an intermediate position of their movement with respect to camera body 12. In this view, it may be seen that side portion 30, having biasing hinge portion 32, corresponds identically to side portion 22 and hinge 26 of the erecting system. As housing 14 is moved in and out with respect to camera body 12, side portions 22 and 30 fold and unfold along the axes of hinges 26 and 32, respectively. Side portions 22 and 30 are both fixedly attached at opposite ends thereof to housing 14 and camera body 12 by any convenient means. For example, tabs 34 and 36 may be folded over and mechanically or adhesively attached to housing 14. Likewise, end portions 38 and 40 are fixedly secured to camera body 12 on either side of the film exposure opening therein. Although end portions 34 and 36 are shown to be attached to housing 14 in a plane substantially normal to the optical axis of the camera, and end portions 38 and 40 are attached to camera body 12 at an angle to the optical axis, it is to be understood that any of the end portions may be attached to the shutter housing or camera body in the most convenient manner and position.

Hinges 26 and 32 are of a design previously known per se, but will be described in more detail later herein. The hinges include an element which acts as a spring to bias the position of the hinge toward either the fully opened or fully closed position. The geometry of the hinge design determines the extent of deflection of the hinge at which an opening or closing bias is exerted by the spring element thereof. At the position illustrated in FIG. 2, hinges 26 and 32 are substantially at their midpoint of angular deflection, that is, housing 14 has been moved away from camera body 12 by a distance approximately equal to one half of its entire travel between the folded and extended positions. Manual movement of housing 14 to a position closer to camera body 12 than that shown in FIG. 2 will result in the spring member of hinges 26 and 32 biasing the movement of side elements 22 and 30, and thereby housing 14, towards movement into the fully closed or folded position of camera 10. Conversely, movement of housing 14 to a position farther from camera body 12 than the position shown in FIG. 2 will cause the spring element of hinges 26 and 32 to bias housing 14 towards movement to its fully open or extended position. From this it may be seen that objective lens 20 and the other elements supported or enclosed by housing 14 may be moved between folded and extended positions with respect to camera body 12 and held in such positions by the action of hinges 26 and 32. Only a manual relative movement of housing 14 and camera body 12 is required to shift these elements between folded and extended positions relative to one another. There are no locking or latching elements associated with the device which require an unlocking movement in order to shift the elements from one position to the other.

Figure 4:
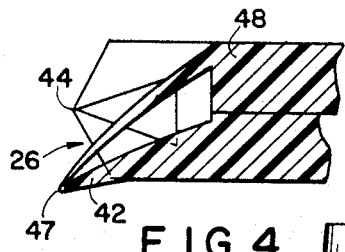
FIGS. 4 and 5 are enlarged, elevational views, in section, of a portion of the structure, showing such portion in two positions.
Figure 5:
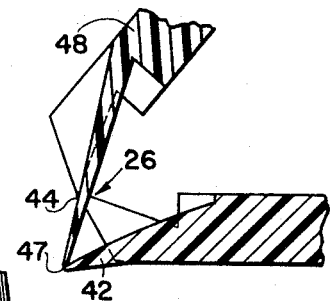
Figure 3:
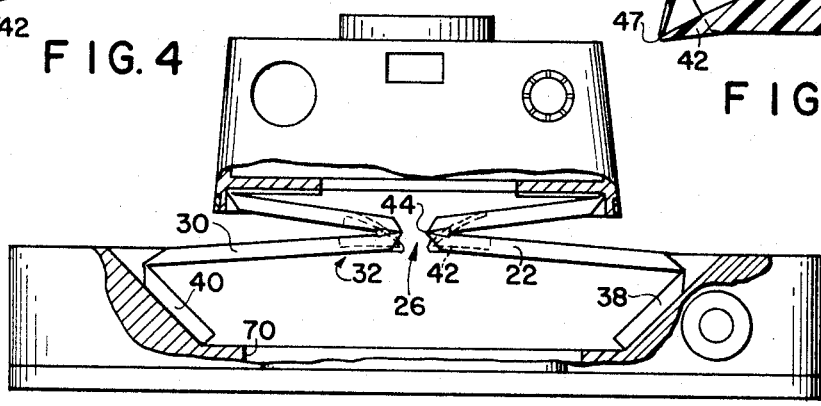
FIG. 3 is a plan view, as in FIG. 2, showing the elements in the folded position.

Referring now to FIGS. 4 and 5, biasing hinge portion 26 may be seen to include leaf spring portion 42 centrally disposed along the folding axis thereof. On either side of spring 42 are portions of side element 22 having a reduced thickness and thereby foldable along the lines indicated in FIG. 1 by the reference numerals 44 and 46. Spring 42 is not attached at its sides to the portions including fold lines 44 and 46, but is attached only at its ends to portions of side element 22 on opposite sides of the fold lines. Spring 42 is designed to exert a biasing force on the portions of side portion 22 on opposite sides of fold lines 44 and 46 which urges the portions toward either the unfolded position shown in FIG. 1 or the folded position shown in FIG. 3, depending upon the position of spring 42 with respect to fold lines 44 and 46. This is more clearly illustrated by the side sectional views of FIGS. 4 and 5. In FIG. 4 hinge 26 is shown in the fully closed position wherein axis 47 about which spring 42 folds is seen to be displaced from fold line 44, with which fold line 46 is in axial alignment. The various portions of hinge 26 are so formed and positioned relative to one another that the portion indicated by the reference numeral 48 is in tension from the biasing force of leaf spring 42. Accordingly, a closing force is exerted on the hinge elements by leaf spring 42 in proportion to the distance between the axis through fold lines 44 and 46 and the nearest point thereto of leaf spring 42. For example, in FIG. 4 this is illustrated by distance $x$ which is the moment arm of the closing force exerted by leaf spring 42.

Reversal of moment direction as the leaf spring crosses the hinge axis of fold lines 44 and 46 results in the spring exerting a biasing force in the opening direction. The elements are shown in FIG. 5 with the leaf spring in the zero bias position, i.e., the distance $x$ is zero. Any movement of the elements away from the position of FIG. 5 toward either the open or closed position will create a moment arm between the hinge axis and the leaf spring which will cause the latter to bias the hinge toward either the fully opened or fully closed position depending on the direction of movement. The hinge can be stabilized at any point within the angular deflection of the tension member 48. The geometry of the leaf spring and tension member 48, as well as the amount of offset of the hinge axis, establishes where the moment arm becomes zero. This determines the angular position at which the hinge automatically locks in the open or closed position.

Figure 6:
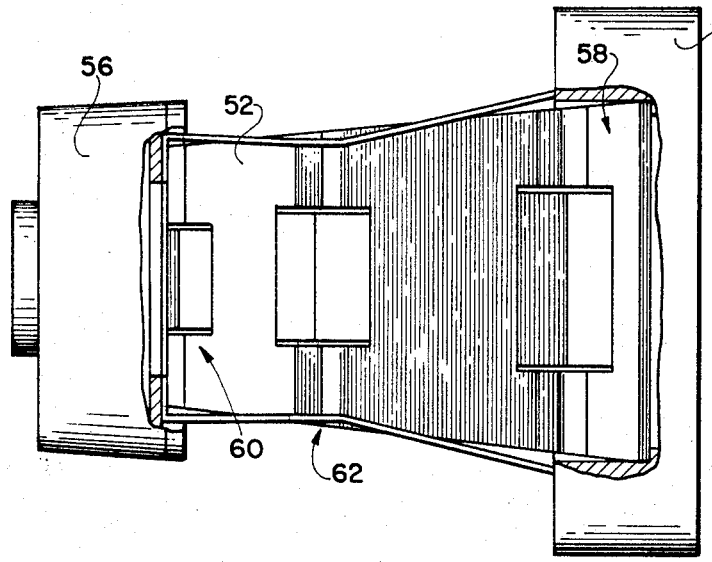
FIG. 6 is a somewhat diagrammatic rear elevational view of the elements in the folded position of FIG. 3.

In FIG. 6 elements similar to those described are shown in a second embodiment. Side portion 52 is disposed between camera body 54 and lens support 56 in the same manner as in the previous embodiment. In order to provide additional biasing force to hold the elements in either the fully open or fully closed position, hinge 58 is provided at the point where side portion 52 is connected to camera body 54 and hinge 60 is provided where side portion 52 is connected to lens support 56. These two hinges are in addition to hinge 62 along the central folding axis of side portion 52. The three hinges 58, 60 and 62 are so designed that they all cross the zero position at approximately the same time when lens support 56 is moved outwardly or inwardly with respect to camera body 54. The hinges may be designed in this manner, in accordance with the previous explanation, although each of the three may be at a different angular deflection at the zero moment position. The use of three such hinges rather than only one will obviously provide a greater latching action tending to hold lens support in either the fully extended or fully retracted position relative to the camera body. Also within the scope of the invention would be the positioning of one or more of the biasing hinge means in any of the three positions indicated in FIG. 6.

Figure 7:
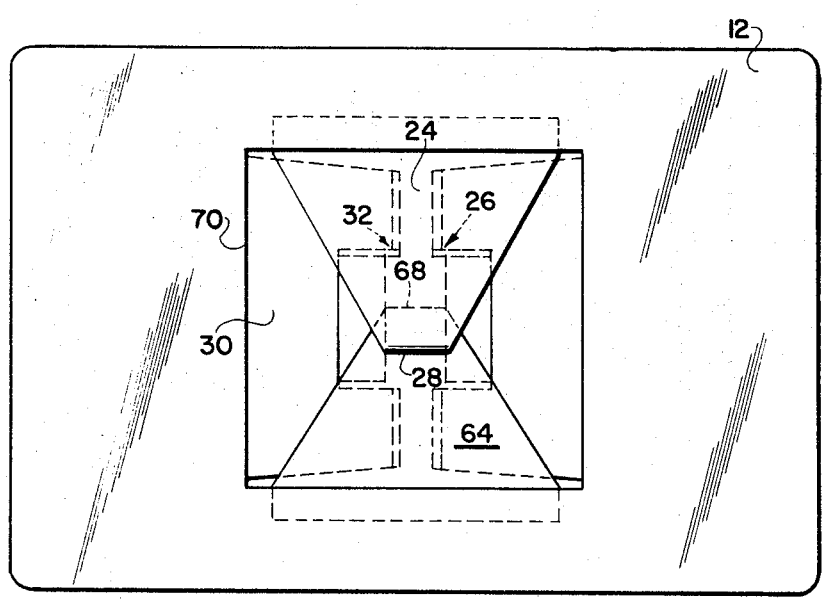
FIG. 7 is a side elevational view, with portions broken away, of another embodiment of the invention.

The elements are shown diagrammatically from the rear in FIG. 7 as they would appear in the closed position. Side element 64 may correspond identically to side element 24, the latter being shown in the open position in FIG. 1. Side elements 24 and 64 fold along lines 66 and 68, respectively, and may overlap in the folded position if required. Rectangular opening 70 represents the exposure opening in registration with which the film is positioned within the camera body for exposure; the lens and shutter housing are not shown in FIG. 7 to provide a clear view of the elements of the erecting system in the closed position. The distance between lens 20 and the film plane within camera body 12 when the elements are in the operative, extended position may be established as desired by proper dimensioning of side elements 22 and 30, and/or side elements 24 and 64, which combine to establish the maximum extent of movement of the lens with respect to the film plane. It is evident, of course, that elements 22, 24, 30 and 64 must be positioned so as not to interfere with the passage of light between the lens and film.

Side elements 24 and 64 fold and unfold freely along axes 28 and 68 and are provided for the purpose of preventing relative movement between the lens support and camera body in the general direction parallel to the hinge axes. Such support could be provided, of course, by many different structures familiar to those skilled in the art, and it is not intended that the invention should be limited to any particular one or that side elements 24 and 64 should necessarily be of the same type as elements 22 and 30. Side portions 22 and 30, in addition to providing stability in a direction parallel to the axes of hinges 26 and 32, incorporate the previously described elements which provide the latching action in the opened and closed positions. It is again emphasized that the design of such hinges, having a leaf spring and tension member to provide automatic latching in either the open or closed position, is previously known and the hinge alone forms no part of the present invention. Side portions 22, 24, 30 and 64 may be individually molded as complete, separate elements, including the hinge portions thereof, in accordance with known techniques from suitable plastic materials such as polypropylene. The resulting structure provides an extremely stable and durable erecting system for establishing the operative position of the objection lens with respect to the camera film plane.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A folding camera comprising, in combination:
 (a) a camera body having means defining a film plane;
 (b) a lens support for an objective lens movable between folded and extended positions relative to said camera body;
 (c) an expansible and collapsible bellows forming a protected light path between said lens and said film plane;
 (d) a plurality of support members extending between said camera body and said lens support, said support members comprising substantially flat, sheet-like members hingedly attached at opposite ends to said camera body and said lens support and movable between open and closed positions as said lens support is moved between said extended and folded positions, respectively, said support members being foldable along centrally disposed lines substantially perpendicular to the direction of movement between said open and closed positions and being effective to prevent relative movement between said lens support and said camera body other than toward said folded position when said lens support is in said extended position; and
 (e) biasing means associated with at least one of said support members, said biasing means being disposed along said centrally disposed line of said support member with which it is associated and movable therewith to urge said support member toward said open position, thereby urging said lens support toward said extended position, when said biasing means is on one side of a zero-biased position thereof, and toward said closed position when said biasing means is on said opposite side of said zero-position, said support members being at an intermediate stage of movement between said opened and closed positions when said biasing means is in said zero-biased position.

2. A folding camera comprising, in combination:
 (a) a camera body having means defining a film plane;
 (b) a lens support for an objective lens movable between folded and extended positions relative to said camera body;
 (c) an expansible and collapsible bellows forming a protected light path between said lens and said film plane;
 (d) a total of four support members enclosed within said bellows and extending between said camera body and said lens support, and movable between opened and closed positions as said lens support is moved between said extended and folded positions, respectively, said support members, when in said opened position, being positioned closely adjacent the inner walls of said bellows and said support members being effective to prevent relative movement between said lens support and said camera body other than toward said folded position when said lens support is in said extended position; and
 (e) biasing means associated with two of said support members and movable therewith to urge said support members toward said opened position, thereby urging said lens support toward said extended position, when said biasing means is on one side of a zero-biased position thereof, and toward said closed position when said biasing means is on the opposite side of said zero-biased position.

3. A folding camera comprising, in combination:
 (a) a camera body having mean defining a film plane;
 (b) a lens support for an objective lens movable between folded and extended positions relative to said camera body;
 (c) an expansible and collapsible bellows forming a protective light path between said lens and said film plane;
 (d) a plurality of support members foldable at approximately the central portions thereof and extending between said camera body and said lens support, and movable between open and closed positions as said lens support is moved between said extended and folded positions, respectively, said support members being effective to prevent relative movement between said lens support and said camera body other than toward said folded position when said lens support is in said extended position; and
 (e) biasing means located at the central portion of at least one of the support members and movable therewith to urge said support members toward said open position, thereby urging said lens support towards said extended position, when said biasing means is on one side of a zero-biased position thereof, and toward said closed position when said biasing means is on the opposite side of said zero-biased position.

4. A folding camera comprising, in combination:
 (a) a camera body having means defining a film plane;
 (b) a lens support for an objective lens movable between folded and extended positions relative to said camera body;
 (c) an expansible and collapsible bellows forming a protective light path between said lens and said film plane;
 (d) a plurality of foldable support members extending between said camera body and said lens support, and movable between open and closed positions as said lens support is moved between said extended and folded positions, respectively, said support members being effective to prevent relative movement between said lens support and said camera body other than toward said folded position when said lens support is in said extended position; and (e) a biasing hinge portion located at a fold on at least one of said support members and movable with said support member to urge said support members toward said open position, thereby urging said lens support towards said extended position, when said biasing means is on one side of a zero-biased position thereof, and toward said closed position when said biasing means is on the opposite side of said zero-biased position.

References Cited

UNITED STATES PATENTS

| 1,939,203 | 12/1933 | Christie | 95—39 |
| 2,143,385 | 1/1939 | Platt | 95—39 |
| 2,925,022 | 2/1960 | Winkler | 95—39 X |

FOREIGN PATENTS 170,246   9/1905   Germany.

JOHN M. HORAN, *Primary Examiner.*